United States Patent
Johnson et al.

(10) Patent No.: US 9,727,490 B2
(45) Date of Patent: Aug. 8, 2017

(54) SELF-LOCKING MASS STORAGE SYSTEM AND METHOD OF OPERATION THEREOF

(75) Inventors: Simon B. Johnson, Bonney Lake, WA (US); Lev M. Bolotin, Kirkland, WA (US); William Storage, San Francisco, CA (US)

(73) Assignee: ClevX, LLC, Kirkland, WA (US)

( * ) Notice: Subject to any disclaimer, the term of this patent is extended or adjusted under 35 U.S.C. 154(b) by 643 days.

(21) Appl. No.: 12/392,748

(22) Filed: Feb. 25, 2009

(65) Prior Publication Data

US 2009/0216982 A1    Aug. 27, 2009

Related U.S. Application Data

(60) Provisional application No. 61/031,107, filed on Feb. 25, 2008.

(51) Int. Cl.
*G06F 12/14*     (2006.01)

(52) U.S. Cl.
CPC .......... *G06F 12/14* (2013.01); *G06F 12/1433* (2013.01)

(58) Field of Classification Search
CPC ...... G06F 12/14; G06F 12/1433; G06F 21/79; G06F 21/80
See application file for complete search history.

(56) References Cited

U.S. PATENT DOCUMENTS

| | | | |
|---|---|---|---|
| 7,476,105 B2 | 1/2009 | Ni et al. | |
| 7,574,200 B2 * | 8/2009 | Hassan et al. | 455/410 |
| 2003/0074590 A1 * | 4/2003 | Fogle et al. | 713/320 |
| 2005/0193144 A1 * | 9/2005 | Hassan | G06F 21/31 709/238 |
| 2006/0288234 A1 * | 12/2006 | Azar et al. | 713/186 |
| 2007/0239955 A1 * | 10/2007 | Teh | G06F 12/0215 711/168 |
| 2009/0106247 A1 * | 4/2009 | Daughtry | G06F 21/604 |
| 2009/0119785 A1 * | 5/2009 | Challener et al. | 726/34 |

OTHER PUBLICATIONS

WO 2007/001866A1, "Data security system", Johnson et al., Aug. 2, 2007, pp. 1-23.*

* cited by examiner

*Primary Examiner* — Aracelis Ruiz
(74) *Attorney, Agent, or Firm* — Schwegman Lundberg & Woessner, P.A.

(57) ABSTRACT

A method of operation of a self-locking mass storage system includes: providing storage media and an inactivity timer; timing a period of read/write inactivity of the storage media using the inactivity timer; comparing the period of read/write inactivity against a preset maximum idle time; locking access to the storage media when the period of read/write inactivity exceeds the preset maximum idle time; and, resetting the period of read/write inactivity following read/write activity while the self-locking mass-storage system is in an unlocked state.

20 Claims, 3 Drawing Sheets

SELF-LOCKING MASS STORAGE SYSTEM AND METHOD OF OPERATION THEREOF

CROSS-REFERENCE TO RELATED APPLICATION(S)

This application claims the benefit of U.S. Provisional Patent Application Ser. No. 61/031,107 filed Feb. 25, 2008, and the subject matter thereof is incorporated herein by reference thereto.

TECHNICAL FIELD

The present invention relates generally to electronic systems, and more particularly, to a system and method for protecting unattended mass storage devices from unauthorized access.

BACKGROUND ART

Security is a critical issue with almost all aspects of computer use. Mass storage systems, such as hard disk drives attached to computers, contain valuable information which is vulnerable to data theft. A great deal of money and effort is being applied to guarding personal, corporate, and government security information.

The most common means of providing mass storage security is to authenticate the owner with a computer entered password. A password is validated by a value previously written into a configuration file stored within the mass storage device. A utility program compares the password against this value, and if a match occurs, the mass storage device will open. Alternatively, the password itself is used as the encryption key to encrypt/decrypt data stored in the mass storage system.

More recently, biometric password systems have been incorporated into some mass storage systems. The user is authenticated by comparing a fingerprint against one stored on the host computer or the mass storage system itself. Since reliability is still an issue with biometric based authentication, it is common practice to provide a password in case a valid user is unable to complete the biometric authentication process.

Some storage systems are equipped with integrated authentication hardware and software, allowing a user to enter a PIN directly on the drive, thus bypassing the need for computer entered passwords.

Unfortunately, all these methods for protecting data do not solve the problem of unlocked and accessible mass storage systems that are left unattended. Once unlocked and connected to their host, mass storage systems remain open until the user performs an operation to re-lock the data. If the authorized user leaves the computer unattended, access to the data in the storage system remains open to unauthorized users.

Thus, a need still remains for securing data in mass storage systems when they are left unattended. In view of the increasing use of mass-storage systems as a means of storage of sensitive data, it is increasingly critical that answers be found to this problem. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a self-locking mass storage system including: providing storage media and an inactivity timer; timing a period of read/write inactivity of the storage media using the inactivity timer; comparing the period of read/write inactivity against a preset maximum idle time; locking access to the storage media when the period of read/write inactivity exceeds the preset maximum idle time; and, resetting the period of read/write inactivity following read/write activity while the self-locking mass-storage system is in an unlocked state.

Additionally, the present invention provides a self-locking mass storage system including: storage media; an inactivity timer for timing a period of read/write inactivity of the storage media; and an interface controller connected to the storage media for locking access to the storage media when the period of read/write inactivity exceeds the preset maximum idle time, and for resetting the period of read/write inactivity following read/write activity while the self-locking mass-storage system is in an unlocked state.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
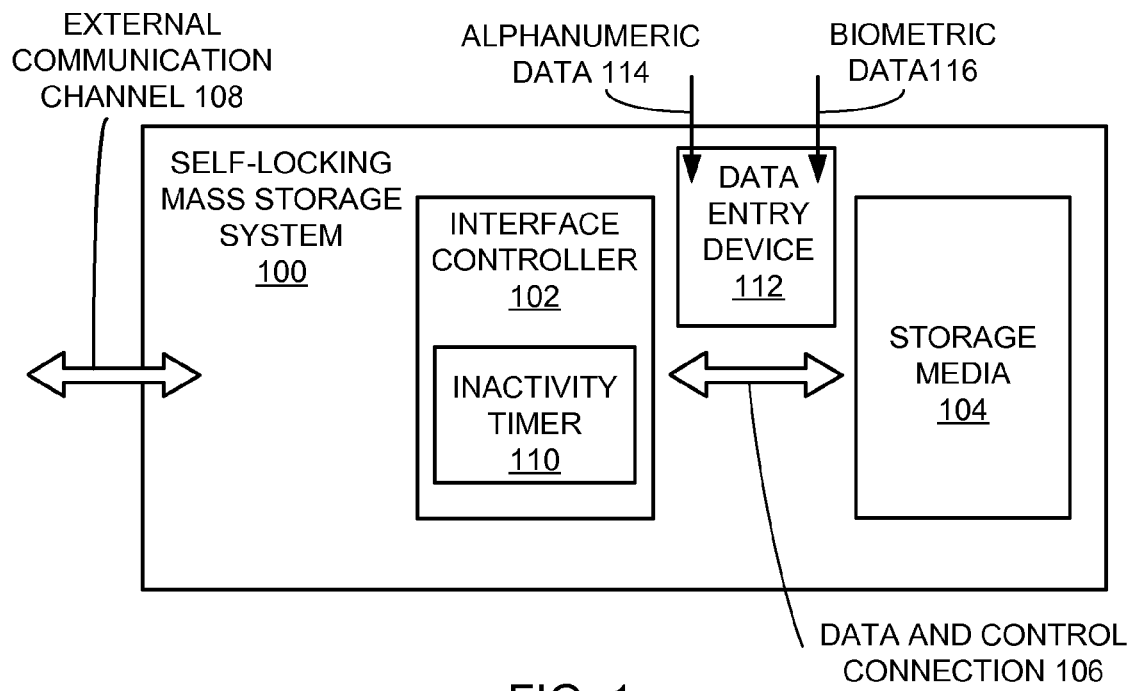
FIG. 1 is a schematic diagram of a self-locking mass storage system in accordance with the first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, the same numbers are used in all the drawing FIGs. to relate to the same elements. The embodiments have been numbered first embodiment, second embodiment, etc. as a matter of descriptive convenience and are not intended to have any other significance or provide limitations for the present invention.

Referring now to FIG. 1, therein is shown a schematic diagram of a self-locking mass storage system 100 in accordance with the first embodiment of the present invention. The self-locking mass storage system 100 includes an interface controller 102 connected to storage media 104 using a data and control connection 106. The interface controller 102 controls the flow of data between the storage media 104 and an external communication channel 108. The self-locking mass storage system 100 includes an inactivity timer 110 embedded within the interface controller 102.

The storage media 104 may be any type of non-volatile memory such as flash memory, hard disks, and magnetic random access memory (MRAM).

Additionally the self-locking mass storage system 100 may include a data entry device 112 for entering authentication data such as a password, a Personal Identification Number (PIN), biometric data, or any other type of data that could be used for authentication. Consequently, the data entry device 112 may be used to input alphanumeric data 114 through keys or touch pads, or to input biometric data 116 using a biometric sensor within the data entry device 112.

Figure 2:
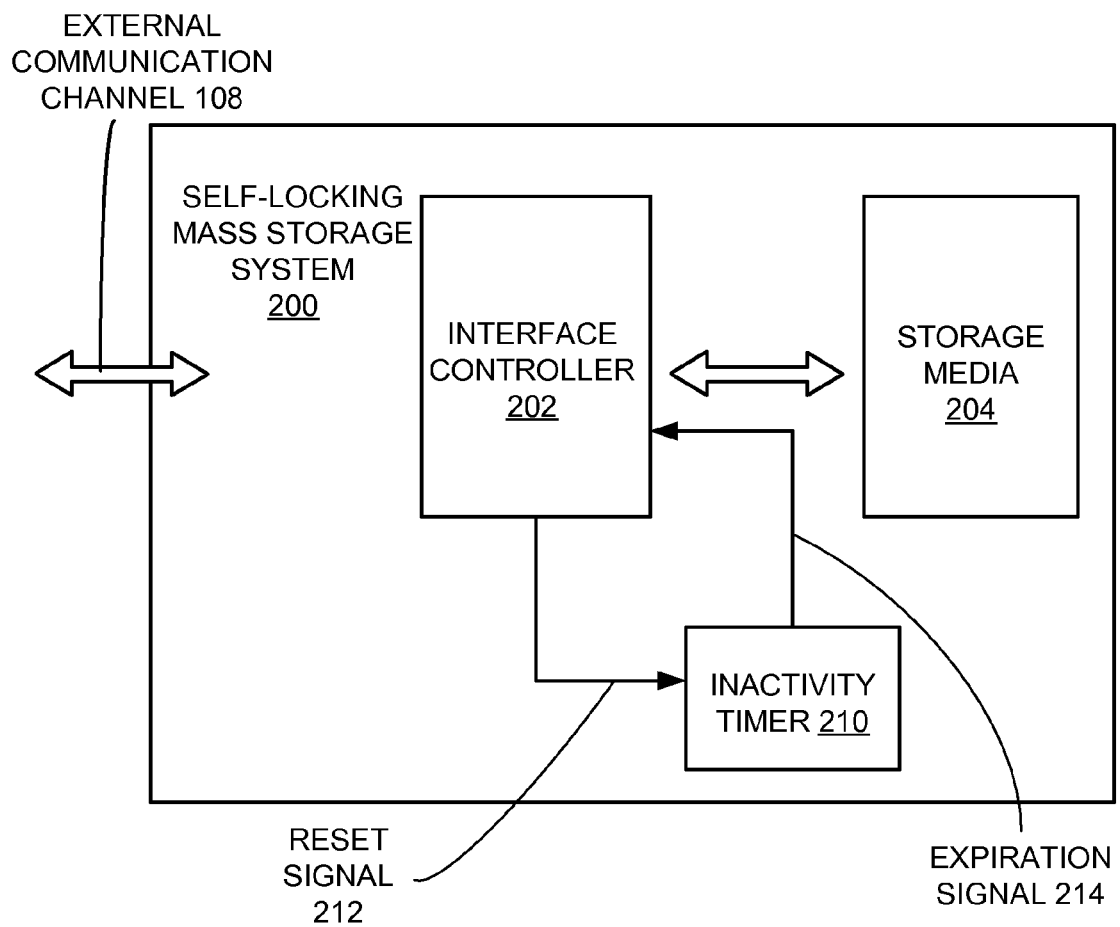
FIG. 2 is a schematic diagram of a self-locking mass storage system incorporating an independent inactivity timer.

Referring now to FIG. 2, therein is shown a schematic diagram of a self-locking mass storage system 200 incorporating an independent inactivity timer 210. In this second embodiment of the present invention, the inactivity timer 210 is separate from an interface controller 202. When a period of read/write inactivity exceeds a preset maximum idle time, the independent inactivity timer 210 can send an expiration signal 214 to the interface controller 202. Upon detection of read/write activity, the interface controller 202 can send a reset signal 212 to the independent inactivity timer 210.

Figure 3:
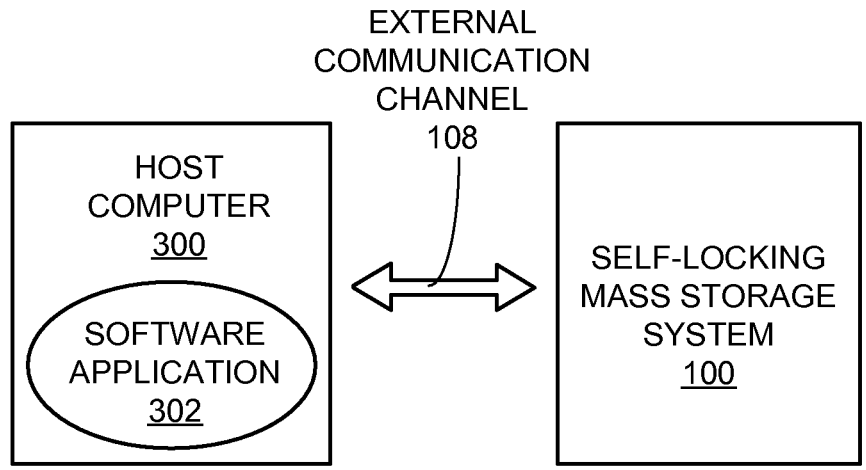
FIG. 3 is a schematic diagram of the self-locking mass storage system connected to a host computer.

Referring now to FIG. 3, therein is shown a schematic diagram of the self-locking mass storage system 100 connected to a host computer 300. A software application 302 is running in the host computer 300. The host computer 300 may be any computing device such as a desktop computer, a laptop computer, or an electronic handheld information device.

Figure 4:
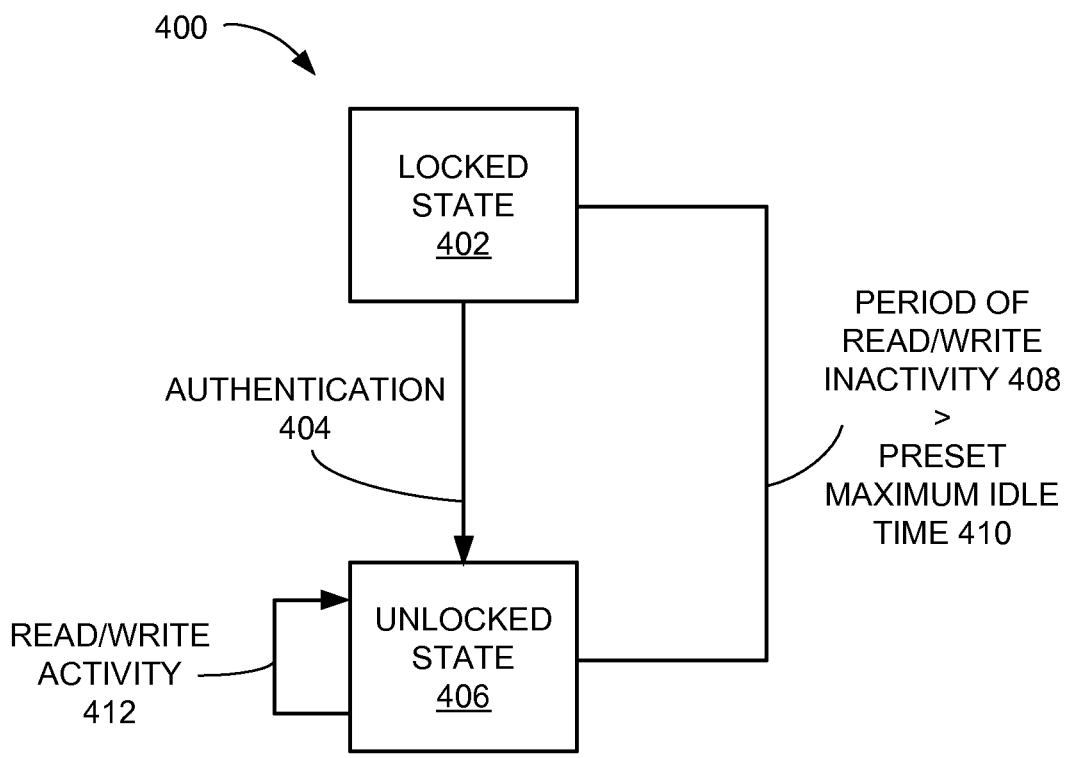
FIG. 4 is a flow chart illustrating the operation of the self-locking mass-storage system.

Referring now to FIG. 4, therein is shown a flow chart 400 illustrating the operation of the self-locking mass-storage system 100. Initially, the self-locking mass-storage system 100 is in a locked state 402. Read/write operations to the storage media 104 are blocked until the self-locking mass-storage system 100 receives an authentication 404 such as a password entered through the software application 302, which sets the self-locking mass-storage system 100 into an unlocked state 406. In alternate embodiments of the invention, the authentication 404 may be a Personal Identification Number (PIN) entered through an input device, or a biometric signature or pattern entered through a biometric reader.

As the self-locking mass storage system 100 is set to the unlocked state 406, the inactivity timer 110 is reset, starting to count a period of read/write inactivity 408. The interface controller 102 allows access to the storage media 104 as long as the period of read/write inactivity 408 does not exceed a preset maximum idle time 410. The period of read/write inactivity 408 is reset every time self-locking mass storage system 100 detects read/write activity 412.

Thus, unlike some other mass storage systems in the market, the self-locking mass storage system 100 of the present invention has the ability to re-lock itself when it detects that a host system may have been left unattended.

Figure 5:
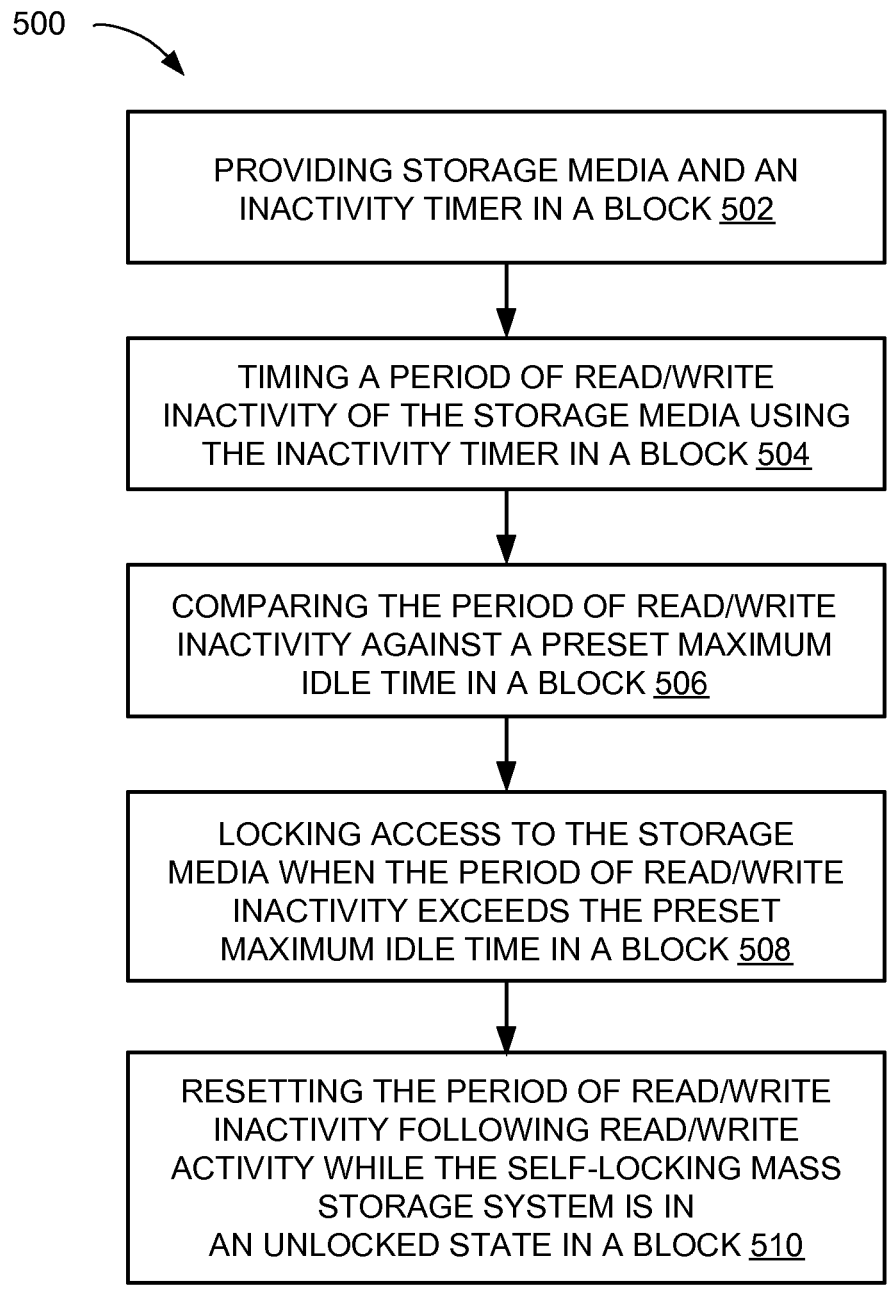
FIG. 5 is a flow chart of a method of operation of a self-locking mass storage system in a further embodiment of the present invention

Referring now to FIG. 5, therein is shown a flow chart of a method 500 of operation of a self-locking mass storage system 100 in a further embodiment of the present invention. The method 500 includes: providing storage media and an inactivity timer in a block 502, timing a period of read/write inactivity of the storage media using the inactivity timer in a block 504, comparing the period of read/write inactivity against a preset maximum idle time in a block 506, locking access to the storage media when the period of read/write inactivity exceeds a preset maximum idle time in a block 508, and resetting the period of read/write inactivity following read/write activity while the self-locking mass-storage system is in an unlocked state in a block 510.

It has been discovered that the self-locking mass storage system of the present invention furnishes important and heretofore unknown and unavailable solutions, capabilities, and functional aspects for providing protection of sensitive data stored is mass storage devices. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a self-locking mass storage system, comprising:

coupling a storage media, an independent inactivity timer, and an external communication channel to an interface controller, the external communication channel configure for connecting the interface controller to a host computer, the independent inactivity timer being separate from the interface controller;

counting a period of read/write inactivity of the storage media using the inactivity timer;

comparing the period of read/write inactivity against a preset maximum idle time;

when the period of read/write inactivity exceeds the preset maximum idle time, sending an expiration signal from the independent inactivity timer to the interface controller;

locking access to the storage media in response to the expiration signal; and resetting the period of read/write inactivity of the inactivity timer for every read/write activity the self-locking mass storage system detects while the self-locking mass-storage system is in an unlocked state, the unlocked state being in response to an authentication operation to unlock the self-locking mass-storage system, wherein resetting the period of read/write inactivity further includes sending a reset signal from the interface controller to the independent inactivity timer.

2. The method as claimed in claim 1 further comprising unlocking access to the storage media using the authentication.

3. The method as claimed in claim 1 further comprising controlling a flow of data between the storage media and the external communication channel by the interface controller.

4. The method as claimed in claim 1 wherein locking access to the storage media when the period of read/write inactivity exceeds the preset maximum idle time is done using the interface controller.

5. The method as claimed in claim 1, wherein the authentication operation includes receiving the authentication by a software application executing on the host computer.

6. A method of operation of a self-locking mass storage system, comprising:
coupling an independent inactivity timer, storage media, a data and control connection linking an interface controller to the storage media, and an external communication channel to the interface controller for connecting the interface controller to a host computer, the independent inactivity timer separate from the interface controller;
unlocking access to the storage media when an authentication signal is received by a software application executing on the host computer;
counting a period of read/write inactivity of the storage media using the inactivity timer;
comparing the period of read/write inactivity against a preset maximum idle time;
locking access to the storage media after the independent inactivity timer sends an expiration signal to the interface controller when the period of read/write inactivity exceeds the preset maximum idle time; and
resetting the period of read/write inactivity of the inactivity timer for every read/write activity the self-locking mass storage system detects while the self-locking mass-storage system is in an unlocked state after using authentication to unlock the self-locking mass-storage system.

7. The method as claimed in claim 6 wherein unlocking access to the self-locking mass storage system using the authentication is done using a data entry device integrated within the self-locking mass storage system.

8. The method as claimed in claim 6 wherein unlocking access to the self-locking mass storage system using the authentication is done using alphanumeric data.

9. The method as claimed in claim 6 wherein unlocking access to the self-locking mass storage system using the authentication is done using biometric data.

10. The method as claimed in claim 6, wherein resetting the period of read/write inactivity further includes:
sending a reset signal from the interface controller to the independent inactivity timer.

11. A self-locking mass storage system comprising:
storage media;
an independent inactivity timer for counting a period of read/write inactivity of the storage media; and
an interface controller connected to the storage media for locking access to the storage media after the independent inactivity timer sends an expiration signal to the interface controller when the period of read/write inactivity exceeds a preset maximum idle time, and for resetting the period of read/write inactivity of the inactivity timer for every read/write activity the self-locking storage system detects while the self-locking mass-storage system is in an unlocked state after using authentication to unlock the self-locking mass-storage system, the interface controller coupled to an external communication channel for connecting the interface controller to a host computer, the independent inactivity timer separate from the interface controller, wherein resetting the period of read/write inactivity further includes sending a reset signal from the interface controller to the independent inactivity timer.

12. The system as claimed in claim 11 wherein the storage media, the inactivity timer, and the interface controller are integrated within a single enclosure.

13. The system as claimed in claim 11 further comprising the host computer and a software application for programming the interface controller.

14. The system as claimed in claim 11 wherein the inactivity timer is embedded within the interface controller.

15. The system as claimed in claim 11 wherein the storage media, the inactivity timer, and the interface controller are integrated within the same enclosure.

16. The system as claimed in claim 11 further comprising a data entry device for providing the authentication for unlocking access to the storage media.

17. The system as claimed in claim 16 wherein the data entry device is configured for input of alphanumeric data.

18. The system as claimed in claim 16 wherein the data entry device is configured to read biometric data.

19. The system as claimed in claim 16 wherein the data entry device is a keypad.

20. The system as claimed in claim 16 wherein the data entry device is a biometric sensor.

* * * * *